United States Patent [19]

Parlor

[11] 4,369,337

[45] Jan. 18, 1983

[54] CENTRAL OFFICE INTERFACE CIRCUIT

[75] Inventor: Bryan R. Parlor, Nepean, Canada

[73] Assignee: Northern Telecom Limited, Montreal, Canada

[21] Appl. No.: 146,237

[22] Filed: May 5, 1980

[30] Foreign Application Priority Data

Apr. 30, 1980 [CA] Canada .................................. 350902

[51] Int. Cl.³ .............................................. H04M 1/00
[52] U.S. Cl. ................................................. 179/81 R
[58] Field of Search ................. 179/1 C, 1 CN, 2 BC, 179/2 C, 2 DP, 81 R, 81 A, 81 B

[56] References Cited

U.S. PATENT DOCUMENTS

| | | | |
|---|---|---|---|
| 4,132,863 | 1/1979 | Smith | 179/81 R |
| 4,197,425 | 4/1980 | Secrett et al. | 179/81 R |
| 4,214,130 | 7/1980 | Questad | 179/81 R |
| 4,232,293 | 11/1980 | Harris | 179/81 R |

Primary Examiner—Joseph A. Popek
Attorney, Agent, or Firm—Robert C. Hogeboom

[57] ABSTRACT

An interface circuit for interconnection between a central office line and a telephone apparatus (e.g. telephone set, automatic telephone answering machine, etc.) is disclosed. The interface circuit includes a rectifier which allows the interface circuit to be connected across the central office line, in parallel with other interface circuits, without the use of isolation switches.

6 Claims, 3 Drawing Figures

000

CENTRAL OFFICE INTERFACE CIRCUIT

This invention relates to a central office interface circuit for telephone equipment (e.g. telephone sets), and more particularly to a central office interface suitable for parallel interconnection across a single central office line without the use of isolating switches, etc.

BACKGROUND OF THE INVENTION

In certain applications a single line from a telephone central office (i.e. a subscriber loop comprising a TIP lead and a RING lead) is shared between several pieces of telephone equipment. One such application would be a telephone set and an automatic telephone answering machine connected to function from the same central office line. Another application is in an electronic key telephone system (EKTS) wherein several telephone sets may share (or have access to) a single line to the central office (CO).

In very simplistic terms, a central office interface is generally located on the subscriber's premises and is employed on the basis of one central office interface circuit per each piece of telephone equipment employed on a common (i.e. shared) central office line. The central office interface is generally designed to appear electrically, to the central office, as a typical telephone set when "off-hook". It is sometimes designed to isolate the DC component of the signal from the AC component of the signal at the subscriber's end.

An important consideration is to ensure that two or more central office interface circuits, when connected in parallel across a common central office line, do not unduly "load-down" the central office line. Expressed in slightly different terms, the idle (or "on-hook") devices sharing the central office line should not draw speech or signalling currents from the central office line at the expense of the busy (or "off-hook") devices sharing the same central office line.

One means of doing this in the prior art has been to use relay contacts to isolate the central office interface circuit from the central office line when the associated piece of telephone equipment is idle, and to connect the central office interface to the central office line when the associated piece of telephone equipment is busy.

The present invention provides a central office interface circuit which performs the same functions as the prior art interface circuit, but does so without the use of relay contacts. The present invention allows many central office interface circuits (constructed according to the present invention) to be connected in parallel, across a common central office line, with the idle interface circuits being effectively non-active, and drawing essentially no current from the central office line.

Stated in other terms, the present invention is an interface circuit for interconnection between first and second leads of a central office line, and a telephone apparatus, the circuit comprising:
 a rectifier means having a pair of input terminals for direct connection to the line, and a pair of output terminals;
 a selectively operable switch means, for connection in a series circuit relationship with the telephone apparatus and the pair of output terminals wherein the telephone apparatus includes a transformer having at least one primary winding and one secondary winding, and wherein the series circuit relationship is made with the primary winding; and
 a capacitance means for connection in parallel to the switch means such that the capacitance can become charged to a maximum voltage level via the rectifier, when the switch is open, thus impeding the flow of alternating current via the capacitance.

Stated in still other terms, the present invention is an interface circuit for interconnection between first and second leads of a central office line, and a telephone apparatus, the circuit comprising:
 a rectifier means having a pair of input terminals for direct connection to the line, and a pair of output terminals;
 a transformer means having a primary winding for selective connection across the pair of output terminals of the rectifier means, and a secondary winding for connection to the telephone apparatus and an impedance, comprising at least a capacitor, connected in parallel to the switch such that the capacitor can become charged to a maximum voltage level via the rectifier, when the switch is open, thus impeding the flow of alternating current via the capacitor.

Stated in yet other terms the present invention is an interface circuit for interconnection between first and second leads of a central office line, and a telephone apparatus, the circuit comprising:
 a rectifier means having a pair of input terminals for direct connection to the line, and a pair of output terminals;
 a transformer having a primary winding which is divided into two approximately equal portions, and a secondary winding for connection to the telephone apparatus;
 a selectively operable switch means, connected intermediate the two portions of the primary winding and in series circuit relationship therewith, the series combination of the switch means and the two portions responsive to signals appearing at the pair of output terminals of the rectifier means, the switch means selectively serving to establish an electrical connection between the primary winding and the rectifier means; and an impedance, comprising at least a capacitor, connected in parallel to the switch such that the capacitor can become charged to a maximum voltage level via the rectifier, when the switch is open, thus impeding the flow of alternating current via the capacitor.

DETAILED DESCRIPTION

Figure 1:
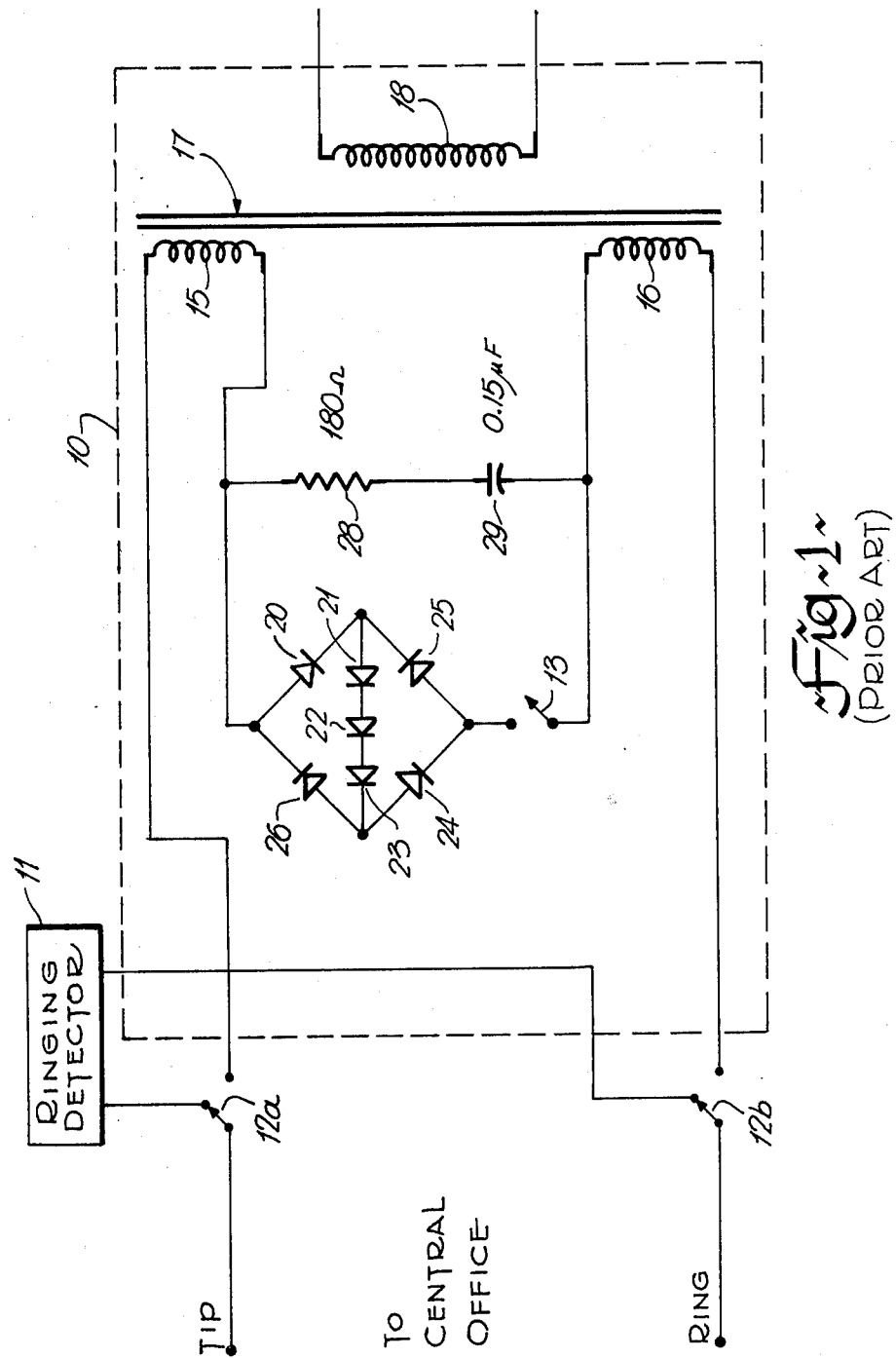
FIG. 1 is a simplified block diagram of a prior art central office interface.

FIG. 1 depicts a not untypical prior art central office interface circuit referred to generally by the reference character 10. Also shown, in block form, is a ringing detector 11. The components are interconnected as shown in FIG. 1, and attention is directed thereto.

The TIP and RING leads are connected to ringing detector 11 via DPDT (double pole double throw) switches 12a and 12b. Note that DPDT switches 12a and 12b are in fact the contacts of a relay (not shown)

but for purposes of simplification are depicted as switches.

Interface circuit 10, as depicted with switches 12a and 12b and switch 13 in their illustrated positions, is in the idle or "on-hook" state. Ringing signals applied to the TIP and RING leads by the central office (CO, now shown) are routed to ringing detector 11 via switches 12a and 12b. When the associated equipment (e.g. a telephone set, not shown) goes "off-hook" in response to the ringing signal, switches 12a and 12b switch to their alternate states (via a relay coil not shown) and switch 13 is closed.

This results in an electrical current path being provided through circuit 10 comprising (when TIP is positive) switch 12a, primary winding 15 of transformer 17, diodes 20, 21, 22, 23, and 24, switch 13, primary winding 16, and switch 12b. The AC currents flowing in windings 15 and 16 of transformer 17 cause an induced AC voltage to be produced in secondary winding 18.

If circuit 10 and ringing detector 11 are the only two pieces of equipment that are connected to the TIP and RING leads, then switches 12a and 12b could be eliminated and a hardwired interconnection could be made between ringing detector 11, interface circuit 10, and the TIP and RING leads. However, if additional equipment (e.g. another telephone set, telephone answering equipment, etc.) is to be connected in parallel with the TIP and RING leads, switches 12a and 12b are required to prevent the relatively low impedance AC path presented by resistor 28, capacitor 29, and the inter-winding capacitance of windings 15 and 16 from attenuating speech and signalling currents destined for other equipment. In short, switches 12a and 12b serve to isolate an AC portion of circuit 10 from the TIP and RING leads; recall that switch 13 already serves to isolate the other portion of circuit 10 from the TIP and RING leads.

It should be noted that the purpose of capacitor 29 and resistor 28 is to provide protection for the contacts of switch 13. As switch 13 serves to produce the dial pulses when dialling, it can be appreciated that switch 13 opens an inductive load, and consequently, the protection circuit is essential.

Figure 2:
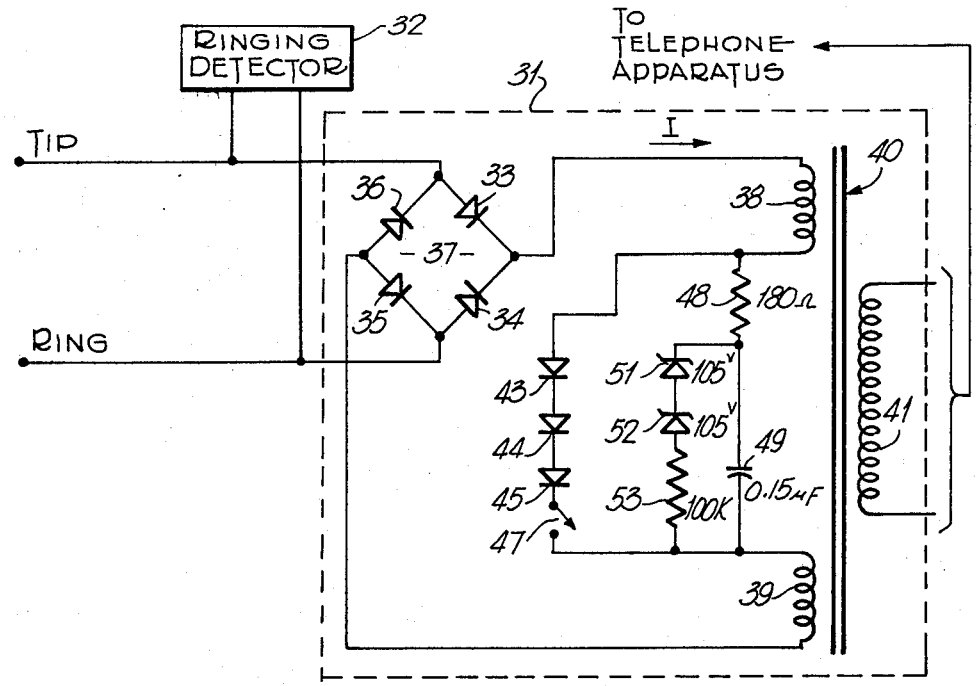
FIG. 2 is a simplified block diagram depicting a first application of a central office interface according to a preferred embodiment of the present invention.

FIG. 2 depicts one preferred embodiment of the present invention, namely central office interface circuit 31. The components are interconnected as shown in FIG. 2, and attention is directed thereto.

It should be noted that ringing detector 32 is hardwired to circuit 31 and to the TIP and RING leads (i.e. a direct connection). As will be explained later, additional equipment (e.g. another telephone set, telephone answering equipment, etc.) can be connected in parallel directly with the TIP and RING (i.e. without any isolating switches) and yet not attenuate speech and signalling currents destined for the other equipment.

An electrical current path is provided through circuit 31 comprising the TIP lead, diode 33, primary winding 38 of transformer 40, diodes 43, 44, and 45, switch 47 (when closed), primary winding 39, diode 35, and the RING lead. If the opposite polarity is applied to the TIP and RING leads then the DC path becomes: the RING lead, diode 34, winding 38, diodes 43, 44, and 45, switch 47 (when closed) winding 39, diode 36, and the TIP lead. The AC currents flowing in windings 38 and 39 cause an induced voltage to be produced in secondary winding 41.

Zener diodes 51 and 52, and resistor 53 provide a protection circuit to pass high DC voltages around capacitor 49, such as might be induced by lightning, etc.

As stated earlier, central office interface circuit 31 does not attenuate currents on the TIP and RING leads from the central office (in the idle or "on-hook" state) and consequently enables additional equipment to be connected directly in parallel with the TIP and RING leads without the use of isolating switches, etc. It is trite to say that the current path (i.e. via diodes 43, 44, 45, etc.) is open in the on-hook state (due to switch 47 being open) and therefore this current path does not load down the TIP and RING leads.

The present invention resides in preventing capacitor 49 and resistor 48 from "loading-down" the TIP and RING leads. When circuit 31 is interfacing a telephone set (not shown) or other piece of telephone equipment that is on-hook, no applied DC current flows through the diode bridge 37 because switch 47 is open. Diode bridge 37 acts as a full wave rectifier producing a direct current I (from any AC signals on the TIP and RING leads such as voice signals) flowing in the direction indicated by the arrow. This results in capacitor 49 charging to a maximum voltage and remaining there since there is no discharge path (due to imperfections in capacitor 49, it will slowly lose its charge if not renewed). Since capacitor 49 has no discharge path it cannot conduct rectified AC current and thus forms an effective barrier to the flow of the rectified AC current.

When switch 47 closes (i.e. off-hook) DC current flows through only two diodes in bridge 37 (e.g. through diodes 33 and 35) and diodes 43, 44, 45, and switch 47 (now closed) provide a discharge path for capacitor 49. Consequently, during "off-hook" conditions capacitor 49 can absorb back EMF currents. Note that switch 47 functions to produce the dial pulses when dialling.

An induced voltage is produced in secondary winding 41 due to the flow of AC current in primary windings 38 and 39. Some AC current will flow through the series connection of resistor 48 and capacitor 49, but this series circuit is primarily for the protection of switch 47, as is well known.

It should be noted that the preferred embodiment of circuit 31 (FIG. 2) has been designed to have similar characteristics to those of circuit 10 in FIG. 1. One will note that the DC path in FIG. 1 has five diode drops (i.e. diodes 20, 21, 22, 23, and 24). Circuit 31 (FIG. 2) has been designed to also have five diodes (i.e. diodes 33, 43, 44, 45, and 35) in its DC path. It should also be noted that ringing detector 32 of FIG. 2 can be the same as ringing detector 11 of FIG. 1, and transformer 40 of FIG. 2 can be the same as transformer 17 of FIG. 1.

Figure 3:
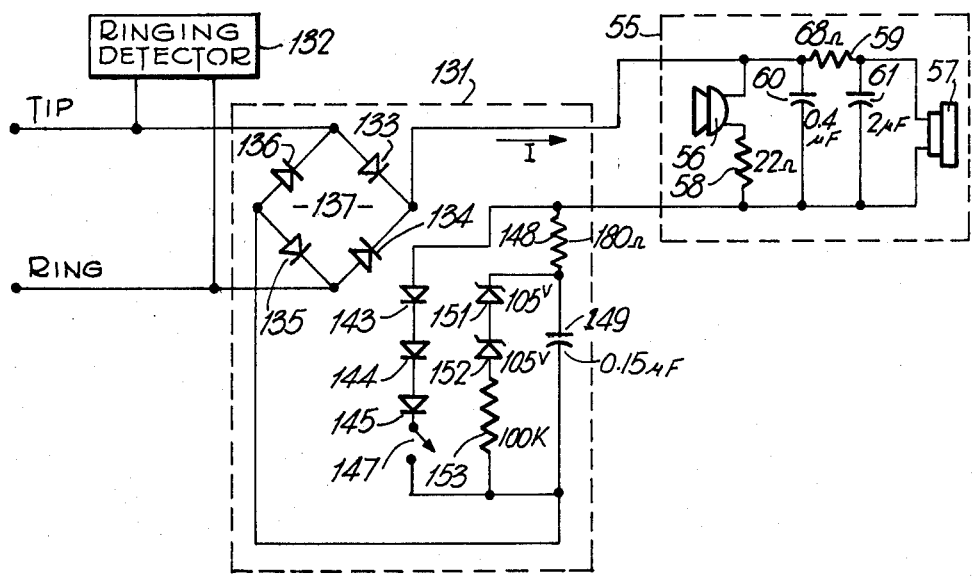
FIG. 3 is a simplified block diagram depicting a second application of a central office interface according to a preferred embodiment of the present invention.

FIG. 3 depicts a simplified central office interface circuit 131, similar to that of FIG. 2, but for use with a handset 55, in lieu of transformer 40 (FIG. 2). The interconnection of the components is as shown in FIG. 3 and attention is directed thereto.

The components of circuit 131 function in the same manner as do the corresponding components (indicated by a reference numeral one hundred less) in FIG. 2; accordingly, that description will not be repeated here.

In FIG. 3 a handset 55 is depicted, in simplified form, instead of transformer 40. Handset 55 is a typical telephone handset comprising a microphone (or mouthpiece) 56 and an earphone (receiver, or earpiece) 57 interconnected by resistors 58 and 59 and capacitors 60 and 61, as shown. Resistor 59 and capacitors 60 and 61 function as a balancing network.

What is claimed is:

1. An interface circuit for interconnection between first and second leads of a central office line, and a telephone apparatus, said circuit comprising:
   a rectifier means having a pair of input terminals for direct connection to said line, and a pair of output terminals;
   a selectively operable switch means, for connection in a series circuit relationship with said telephone apparatus and said pair of output terminals wherein said telephone apparatus includes a transformer having at least one primary winding and one secondary winding, and wherein said series circuit relationship is made with said primary winding; and
   a capacitance means for connection in parallel to said switch means such that said capacitance can become charged to a maximum voltage level via said rectifier means, when said switch means is open, thus impeding the flow of alternating current via said capacitance.

2. An interface circuit for interconnection between first and second leads of a central office line, and a telephone apparatus, said circuit comprising:
   a rectifier means having a pair of input terminals for direct connection to said line, and a pair of output terminals;
   a transformer means having a primary winding for selective connection, by a switch means, across said pair of output terminals of said rectifier means, and a secondary winding for connection to said telephone apparatus; and
   an impedance means, comprising at least a capacitor, connected in parallel to said switch means such that said capacitor can become charged to a maximum voltage level via said rectifier means, when said switch means is open, thus impeding the flow of alternating current via said capacitor.

3. The interface circuit of claim 2 wherein said rectifier means is a diode bridge circuit interconnected as a full-wave rectifier.

4. An interface circuit for interconnection between first and second leads of a central office line, and a telephone apparatus, said circuit comprising:
   a rectifier means having a pair of input terminals for direct connection to said line, and a pair of output terminals;
   a transformer having a primary winding which is divided into two approximately equal portions; and a secondary winding for connection to said telephone apparatus;
   a selectively operable switch means, connected intermediate said two portions of said primary winding and in series circuit relationship therewith, the series combination of said switch means and said two portions responsive to signals appearing at said pair of output terminals of said rectifier means, said switch means selectively serving to establish an electrical connection between said primary winding and said rectifier means; and
   an impedance means, comprising at least a capacitor, connected in parallel to said switch means such that said capacitor can become charged to a maximum voltage level via said rectifier means, when said switch means is open, thus impeding the flow of alternating current via said capacitor.

5. The interface circuit of claim 4 wherein said switch means includes a plurality of diodes, series connected with said switch means so as to be forward biased and capable of conducting current when said switch means is closed.

6. The interface circuit of claim 4 or 5, further including a ringing detector connected across said first and second leads.

* * * * *